R. L. McGowan,

Nut Lock.

No. 106849.  Patented Aug. 30. 1870.

Witnesses.
Cha. H. ooapad
John F. Price

Inventor.
R. L. McGowan

United States Patent Office.

ROBERT L. McGOWAN, OF NEW BRIGHTON, ASSIGNOR TO HIMSELF, CHARLES A. WOODS, OF PITTSBURG, PENNSYLVANIA, JOHN FLETCHER, OF RAVENNA, OHIO, AND THOMAS JOHNSTON, OF ALLEGHENY, PENNSYLVANIA.

Letters Patent No. 106,849, dated August 30, 1870.

IMPROVEMENT IN COMBINED LOCK-NUTS AND SPLICE-BARS.

The Schedule referred to in these Letters Patent and making part of the same.

*To all whom it may concern:*

Be it known that I, ROBERT L. McGOWAN, of New Brighton, in the county of Beaver and State of Pennsylvania, have invented a new and useful Improvement in Lock-Nuts and Splice-Bars Combined; and I do hereby declare that the following is a full, clear, and exact description thereof, reference being had to the accompanying drawing and to the letters of reference marked thereon.

The nature of my invention consists in constructing the bearing surface of the heads of bolts and their screw-nuts for securing splice-bars to the rails of railways, that said bearing surfaces shall be convexed and fitted to a corresponding concavity made in the outer surface of the splice-bars and arranged with relation to each other, so that the convexed surface of the screw-nuts can be forced into the concavity in the splice-bar by it yielding to the wrenching of the screw-nuts, which are held in a locked position through the medium of the said convexed surface of the heads of the bolts and their screw-nuts, combined with the yielding of the several parts to each other, and the concavity in the splice-bar.

To enable others skilled in the art to make and use my invention, I will proceed to describe its construction and operation.

In the accompanying drawing which forms part of my specification—

In the accompanying drawing—

A represents the ordinary T-rail for railways.

Figure 1:
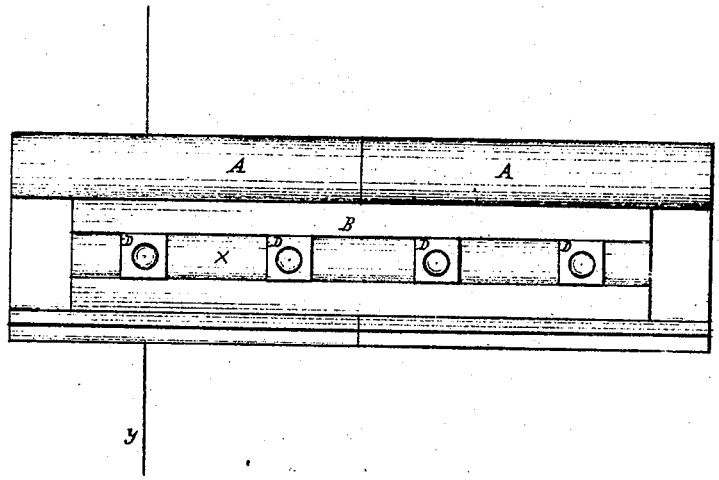
Figure 1 is a side view of rails for railways provided with my improvement in lock-nuts and splice-bars combined.
Figure 2:
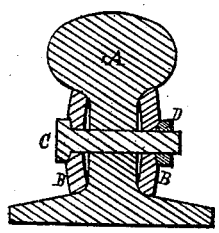
Figure 2 is a transverse section of the same when cut through at line *y* of fig. 1.

B represents the splice-bars, the form of which is clearly indicated in figs. 1 and 2.

C represents the bolts, and

D the screw-nuts, used for securing the splice-bars to the rails.

The bearing surface of the heads of the bolts, and the bearing surface of the screw-nut are made convexed, as shown in fig. 2.

These convexed surfaces are fitted and adapted to a concavity or groove, *x*, made in the splice-bars.

By and through the medium of the convexed surface of the heads of the bolts and their screw-nuts, and the concavity or groove *x* in the splice-bars, combined with the yielding of the several parts to the wrenching of the nuts in screwing the parts together, the nuts will be held in a locked position with relation to the bolts, splice-bars, and rails; the advantage of which will be apparent to all skilled in the art of constructing railways.

Having thus described my improvement,

What I claim as of my invention is—

The combination of a bolt with convex under surface of head, and convex nuts with fish-plates, having a concave outer surface, into which said bolt-head and nut rest, substantially as described.

R. L. McGOWAN.

Witnesses:
CHAS. HOOPS,
JAMES J. JOHNSTON.